US009430671B2

(12) United States Patent
Aghasaryan et al.

(10) Patent No.: US 9,430,671 B2
(45) Date of Patent: Aug. 30, 2016

(54) METHOD AND APPARATUS FOR PRIVACY PROTECTED CLUSTERING OF USER INTEREST PROFILES

(71) Applicant: Alcatel Lucent, Boulogne Billancourt (FR)

(72) Inventors: Armen Aghasaryan, Nozay (FR); Makram Bouzid, Nozay (FR); Mohit Kothari, Gujarat (IN); Animesh Nandi, West Bengal (IN)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/414,835

(22) PCT Filed: Jul. 3, 2013

(86) PCT No.: PCT/EP2013/001958
§ 371 (c)(1),
(2) Date: Jan. 14, 2015

(87) PCT Pub. No.: WO2014/012627
PCT Pub. Date: Jan. 23, 2014

(65) Prior Publication Data
US 2015/0135329 A1    May 14, 2015

(30) Foreign Application Priority Data

Jul. 16, 2012  (EP) .................................. 12290234

(51) Int. Cl.
*G06F 21/62* (2013.01)
*H04L 29/08* (2006.01)
(Continued)

(52) U.S. Cl.
CPC ..... *G06F 21/6245* (2013.01); *G06F 17/30598* (2013.01); *H04L 9/3236* (2013.01); *H04L 63/0407* (2013.01); *H04L 63/0421* (2013.01); *H04L 67/306* (2013.01); *H04L 63/18* (2013.01)

(58) Field of Classification Search
None
See application file for complete search history.

(56) References Cited

U.S. PATENT DOCUMENTS 6,134,597 A  * 10/2000 Rieth et al. .................... 709/237
2002/0091736 A1 *  7/2002 Wall .............................. 707/513
(Continued)

FOREIGN PATENT DOCUMENTS

JP       2010-067175         3/2010
WO      WO 02/15474 A2       2/2002

OTHER PUBLICATIONS

Patrizio Dazzi et al., "Experiences with complex user profiles for approximate P2P community matching," 11$^{th}$ IEEE International Conference on Computer and Information Technology, pp. 53-58, XP032058494, Aug. 31, 2011.

(Continued)

*Primary Examiner* — David Le
(74) *Attorney, Agent, or Firm* — Fay Sharpe, LLP

(57) ABSTRACT

According to an implementation of the present subject matter, apparatus and methods for privacy protected clustering of user interest profiles are described. The method includes generating at least one interest profile segment based on an interest profile of an end user (404). Further, semantic terms corresponding to the at least one interest profile segment are obtained based on interaction with a semantic metadata database coupled to a user device of the end user (406), wherein the semantic terms are obtained from amongst one or more semantic terms provided in the semantic metadata database. Each of the at least one interest profile segment are subsequently transformed into at least one semantic representation (408). Further, a cluster identifier is assigned to the at least one interest profile segment based on the at least one semantic representation, wherein the cluster identifiers are generated using locality sensitive hashing (LSH) technique (410).

15 Claims, 6 Drawing Sheets

(51) Int. Cl.
*H04L 29/06* (2006.01)
*H04L 9/32* (2006.01)
*G06F 17/30* (2006.01)

(56) References Cited

U.S. PATENT DOCUMENTS

2007/0038659 A1 2/2007 Datar et al.
2008/0205774 A1* 8/2008 Brinker et al. ............... 382/225
2010/0070507 A1 3/2010 Mori
2014/0223575 A1* 8/2014 Nandi et al. .................... 726/27

OTHER PUBLICATIONS

International Search Report for PCT/EP2013/001958 dated Nov. 8, 2013.

* cited by examiner

METHOD AND APPARATUS FOR PRIVACY PROTECTED CLUSTERING OF USER INTEREST PROFILES

FIELD OF INVENTION

The present subject matter relates to personalized services and data analytics and, particularly but not exclusively, to privacy protection of end users while clustering the user interest profiles for the personalized services and data analytics.

BACKGROUND

Owing to the huge mass of content available over the World Wide Web, end users accessing content provided by service providers are often provided personalized assistance and data analytics by the service providers, search engines, web publishers, and advertisers for easily accessing relevant content. Conventionally, various techniques, such as content based recommendation, collaborative recommendation, and data analytics, are used to provide personalized services to the end users. In content based recommendation, the end users are recommended content, services or products which are similar to the content, services or products used or liked by the end users in the past or which match the interest or choice of the end user. In collaborative recommendation, the end user is recommended content, services or products which are similar to the content, services or products used or liked by other end users having similar or same interest or choices.

In an example of content based recommendation, a movie review website may monitor an end user to regularly view a certain category of movies, for example, animated movies. Accordingly, every time an animated movie is available for view, the end user may be provided a recommendation, such as a notification or an alert, for example, to download the movie by making relevant payments. Similarly, in collaborative recommendation, also known as collaborative filtering, service providers may provide targeted advertisements to an end user where these advertisements pertain to product or services that have been preferred by other end users who have similar interests and preferences as the end user. For example, an internet protocol television (IPTV) service provider may recommend television shows or movies to the end user, if the television shows or movies have been viewed by other end users whose interests match the interests of the end user.

Further, users need to provide their personnel data to service providers for executing data analytics applications, for example, for data mining purposes. In midst of all these techniques for data analytics and offering relevant content to the end users by the service providers, users of today feel increasingly concerned about their personal and potentially sensitive information. This is mainly because in order to benefit from the personalized services and facilitate data analytics, the end users have to reveal sensitive information, but at the same time, they are concerned about the privacy protection of the information. For example, an end user of a social networking site may not object to the use of the information of his accessing social networking sites to make anonymous recommendations to other end users and to himself regarding updates on social networking sites as such, but the end user may not want the other entities, such as other end users, the service providers, attackers and malicious parties, to know the particular URLs that the end user visited or rated.

SUMMARY

This summary is provided to introduce concepts related to privacy protection while clustering end users for providing personalized services and executing data analytics applications. This summary is not intended to identify essential features of the claimed subject matter nor is it intended for use in determining or limiting the scope of the claimed subject matter.

In one implementation, a method for privacy protected clustering of user interest profiles is described. The method includes generating at least one interest profile segment based on an interest profile of an end user. The method further includes obtaining semantic terms corresponding to the at least one interest profile segment based on interaction with a semantic metadata database coupled to a user device of the end user where the semantic terms are obtained from amongst one or more semantic terms provided in the semantic metadata database. Each of the at least one interest profile segment are subsequently transformed into at least one semantic representation. The method further includes assigning a cluster identifier to the at least one interest profile segment based on the at least one semantic representation where the cluster identifiers are generated using locality sensitive hashing (LSH) technique.

In another implementation, a user device for privacy protected clustering of user interest profiles is described. In said implementation, the user device includes a processor and a memory coupled to the processor. The memory includes a profile transformation module configured to obtain semantic terms corresponding to at least one interest profile segment based on interaction with a semantic metadata database coupled to the user device. In one embodiment, the semantic terms are obtained from amongst one or more semantic terms provided in the semantic metadata database. The profile transformation module is further configured to transform each of the at least one interest profile segment into at least one semantic representation. The memory further includes a cluster identifier module configured to generate, based on the at least one semantic representation, a cluster identifier using locality sensitive hashing (LSH) and assign the to the cluster identifier to at least one interest profile segment based on the at least one semantic representation.

In another implementation, a computer-readable medium having embodied thereon a computer readable program code for executing a method is described. The method may include generating at least one interest profile segment based on an interest profile of an end user. The method further includes obtaining semantic terms corresponding to the at least one interest profile segment based on interaction with a semantic metadata database coupled to a user device of the end user where the semantic terms are obtained from amongst one or more semantic terms provided in the semantic metadata database. Each of the at least one interest profile segment are subsequently transformed into at least one semantic representation. The method further includes assigning a cluster identifier to the at least one interest profile segment based on the at least one semantic representation where the cluster identifiers are generated using locality sensitive hashing (LSH) technique.

BRIEF DESCRIPTION OF THE FIGURES

The detailed description is described with reference to the accompanying figures. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

Figure 1:
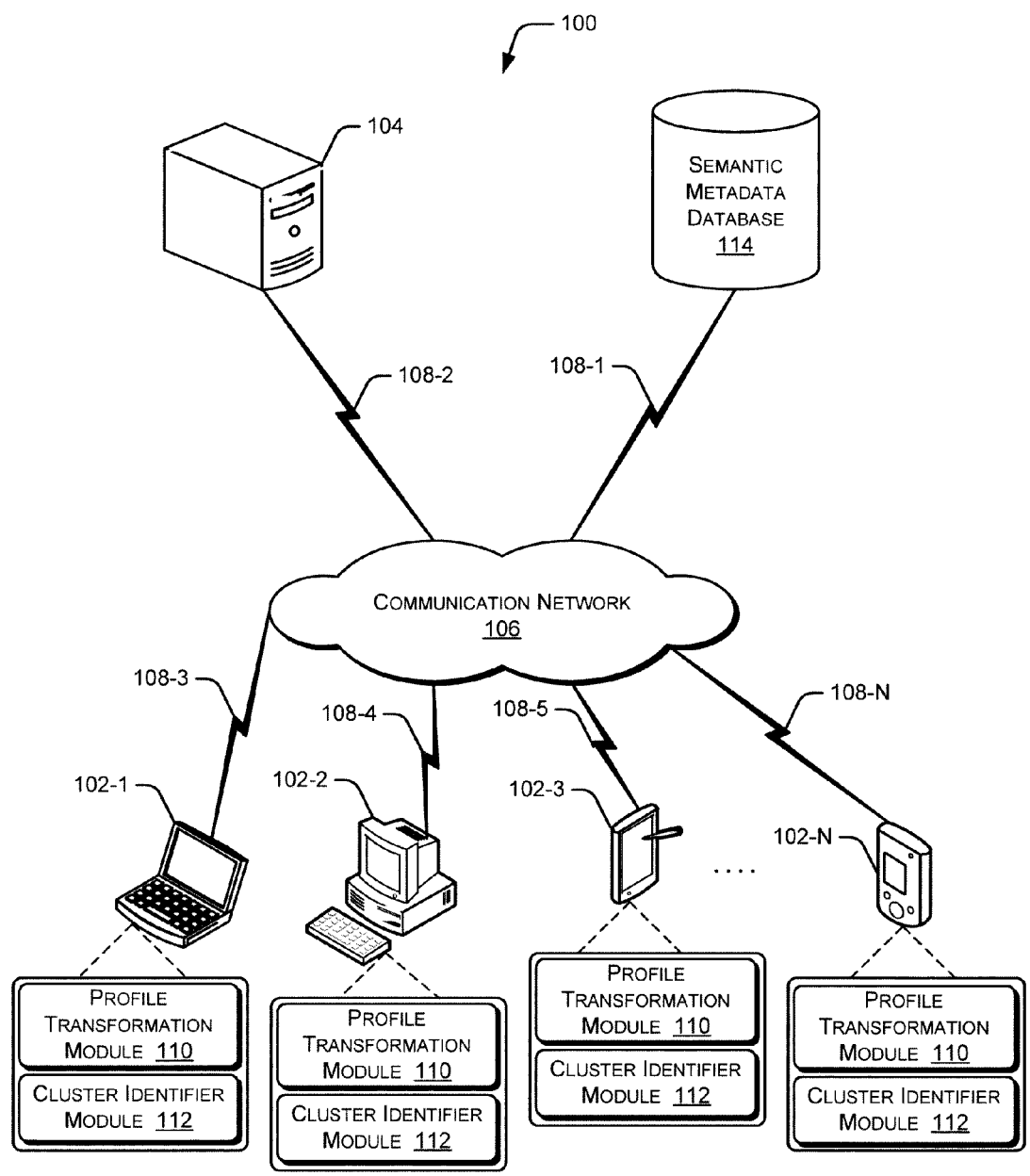
FIG. 1 illustrates an exemplary network environment implementation of privacy protected clustering of user profiles for privacy protection of personal information, according to an embodiment of the present subject matter.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

DESCRIPTION OF EMBODIMENTS

Systems and methods for providing privacy to personal information of end users are described. The systems and methods can be implemented in various user devices used by end users to avail services or view content provided by a service provider. Further, the user devices may be communicating with distributed servers and other user devices through various networks. The user devices and distributed servers that can implement the described method(s) include, but are not limited to, computing devices, such as a laptop, a desktop computer, a notebook, a mobile phone, a personal digital assistant, a workstation, a mainframe computer, a set top box, a media player, central directory servers, database server, file server, print server, web server, application server, and the like. Although the description herein is with reference to personal computers and distributed servers providing recommendation services and executing data analytics applications, the methods and systems may be implemented in other server and computing systems providing connectivity to the end users for protecting their privacy, as will be understood by a person skilled in the art.

Although recommendation services and personalized content are provided to different end users by service providers through various networks, the methods and systems described herein are access independent, and support multiple access types including Global System for Mobile (GSM), Wideband Code Division Multiple Access (W-CDMA), Code Division Multiple Access (CDMA), Wireless Local Area Network (WLAN), Wireline, Local Area Network (LAN), and other networks providing connectivity.

Conventionally, many service providers attempt to personalize the services provided to end users, such as services of providing content, such as videos, audio, news, advertisements, etc., based on personal details, preferences, and choices of the end users. For this purpose, the service providers use various techniques to recommend services, contents, or products and execute data analytic applications based on factors like personal information, such as age, sex, and location of the end user; on the past actions of the end user, or past preferences by other end users who have been identified to have similar interests as that of the end user.

For example, if an end user, say user A, has purchased a book written by a particular author, the service provider may suggest the user A to purchase other books written by the same author or other books on the same or related subjects, etc. In a similar but another conventional approach, the service provider may recommend to the end user A those contents, or products that have been preferred by other end users having an interest profile similar to that of the end user A. For the purpose of providing personalized services and for data analytics, various conventionally known methods are used to cluster the end users having similar interests into one or more interest groups.

The conventional methods of clustering implemented by the service provider require collection of information related to personal preferences, choices, etc., of the end users. Conventionally, the service providers monitor and collect information pertaining to the end users through various means, such as by analyzing log files, application history files or other personally identifiable information saved on the end user's client device or provided by the user while registering with the service provider. In another conventional technique, the service provider may save a text file, such as a Hyper Text Transfer Protocol (http) cookie to collect information pertaining to an end user. For example, a web portal may save user preference data including an http cookie of a web browser of an end user to store the preferences of the end user, such as font size, arrangement of display widgets, etc. Further, the user preference data may also store the browsing details of the end user and send the same to the web portal.

Thus, in an attempt to provide recommendation services, personalized content, services or products to the end user based on the end user's personal choice, the service provider often monitors and collects information pertaining to activities of the end user. In certain situations, it becomes possible to identify the end user on the basis of the information collected by the service providers. This may result in compromising the personal or confidential information of the end user and exposes the end user to potential privacy breaches or makes him the target of advertisers or spammers, etc. Further, in extreme cases, the end user may become a victim of various crimes, such as identity theft and credit card frauds.

Further, in present days when end users are connected to each other through virtual social networks via high speed communication support, end users are constantly sharing private and personal information to a broad class of applications, such as StumbleUpon©, GoogleNews™, Foursquare®, Facebook®, Yahoo!®, and Twitter™. Although the nature of sensitive personal information revealed depends on the type of application, such as location for location based services (LBS) and browsing history for uniform resource locator (URL) recommender systems; infusion of these applications into the all-encompassing framework of Online Social Networks (OSNs), wherein OSNs are beginning to act as a 'one-stop-shop' for offering recommendation services, is putting the personal information of users at higher risks than ever.

Recently, different approaches to preserving privacy, while still executing data analytics applications and providing personalized services, such as recommendation services; personalized content, personalized search/query, social networks, data mining, and other related services, have been proposed.

One of such existing approach involves clustering the interest profiles using homomorphic encryption based strategies. In such an approach, the interest profiles of the users are encrypted using crypto techniques, such as homomorphic encryption in order to provide privacy to the users. Such crypto techniques enable execution of protocol primitive operations, such as addition and multiplication for clustering the interest profiles using a distributed computation setting. Using the distributed computation setting allows executing multiple phases of the protocol primitive operations over user devices of a static set of end users. For instance, KMeans clustering algorithm may be implemented in privacy preserving method used the technique of homomorphic encryption. Although techniques using the homomorphic encryption facilitate providing privacy to the end users, such techniques are usually resource intensive and complex to execute. Further, executing multiple phases of the protocol primitive operations over user devices of a static set of end users restricts application of such techniques in dynamic environments, such as online portals where the set of end users changes dynamically with end users constantly joining and leaving the online portals.

Further, certain approaches provide centralized solution where centralized intermediaries configured to cluster the interest profiles are un-trusted by the end users. In such situations, each end user initially pre-process the interest profile using a random projection based approach, such as encryption to obtain a projected interest profile before being communicated to the centralized intermediary. The projected interest profile are typically obtained by transforming the interest profiles using random projection functions not available with the centralized intermediaries, thus ensuring privacy of the end user's data. The random projection functions are however, shared among the end user's intending to be a part of a common cluster to ensure that all the similar interest profiles are transformed into similar projected interest profile for facilitating an efficient and correct clustering. However, sharing the random projection functions among the end users may enable leaking of the random projection function as a malicious end user may provide the random projection function to the centralized intermediaries for obtaining original interest profiles from the projected interest profiles.

Another technique for protecting private information is the use of a gossip-on-behalf approach with a proxy node configured to transmit the interest profile on behalf of the end user. Such a technique involves transmitting the user profile of the end users to the proxy nodes, through an intermediary node, using an encrypted two-hop communication in order to hide the end users identity from the proxy node. However, sharing the complete interest profile with the proxy node may facilitate linkability attacks as the proxy nodes may identify the end users by analyzing the interest profiles over a period of time.

According to an implementation of the present subject matter, systems and methods for ensuring privacy while clustering user interest profiles of end users for providing privacy to personal information of the end users are described. As described before, the systems and methods can be implemented in a variety of processing and communicating devices capable of communicating with a network according to various different standards defined for the communication. Further, the systems and methods described herein may be connected through either wired networks or wireless networks provided via different means.

The systems and methods as described herein, on one hand, provide true protection to private information of the end users by providing anonymity to each end user and their private information without limiting the use of applications, and on the other, also provide the end user with capability of utilizing any computing device including a thin client, such as a mobile device with limited computational capability to receive personalized services or to use any other applications or services requiring the user clustering according to the similarity of their private data. In one embodiment, a privacy protected network includes a plurality of end users associated with user devices for communicating with each other or distributed servers, such as one or more aggregator nodes.

In accordance with an embodiment of the present subject matter, to provide personalized content and recommendation services to an end user, clusters of the end users having similar interest profiles are created. For the purpose, the user devices of each of the end users initially generate the interest profile of the end user based on profile data, such as the personal choices and preferences of the end user. For instance, the user device may obtain list of all URLs visited by the end user, all videos searched for or watched by the end user, music listened to and searched by the end user, and data related to other similar interest fields explored by the end users.

In one embodiment, the interest profiles may be subsequently segmented into multiple interest profile segments with each segment corresponding to a particular interest field. Examples of the interest fields include, but are not limited to, contextual preferences, such as professional interests, leisure preferences, and religious preferences and areas of interest, such as music, dance, e-shopping, and social networking. The interest profile segments may be subsequently processed for clustering into various interest groups. In another embodiment, the interest profile as a whole may be processed for clustering into various interest groups.

The interest profile segments are subsequently transformed into compact and semantically dense representations referred to as semantic representations. Semantic representations of the interest profile segments include, as an example and not a limitation, tag based representations, ontology concept based representations, and topic based representations. For example, the interest profile corresponding to a URL of a social networking site "xyz.com" may be transformed to the semantic representation "social networking site".

For the purpose, the user device may interact, over an anonymous communication channel, with a semantic metadata database having a list or a dictionary of semantic terms that may be used for transforming the interest profile segments into corresponding semantic representations. In one embodiment, the user device may provide the interest profile segments to the semantic metadata database which may identify the semantic term corresponding to each of the interest profile segments to transform the interest profile segments into the corresponding semantic representations. In another embodiment, the user device may obtain the list of the semantic terms from the semantic metadata database and then identify the semantic term matching the interest profile segment to obtain the corresponding semantic representations. In yet another embodiment, the user device itself may include a metadata having the semantic terms extracted from web pages browsed by the end user. In said embodiment, the user devices are configured to share a vocabulary of semantic terms with each other so that the semantic representations generated by the different user devises are expressed using same terms and are therefore comparable.

The semantic representations thus obtained may be assigned a cluster identifier to identify the interest groups to which the end user can be associated. The cluster identifiers may be assigned using a technique of locality sensitive hashing (LSH). The LSH technique involves converting each of the semantic representations into corresponding hash codes, i.e., the cluster identifiers, using the semantic representations and a set of hash functions defined by random values, such as a common sequence of random vectors generated at each of the user device. Assigning cluster identifiers at the user device facilitates in providing privacy protection as the interest profile are not shared with the remote nodes. Further, using the LSH technique helps in increasing the efficiency in the clustering of the user profiles as the clustering can now be performed easily by matching the hash codes. Furthermore, using the semantic metadata database helps in reducing the occurrences of false negatives and false positives, thus increasing the efficiency of the clustering. Thus, performing the clustering by the LSH technique in conjunction with profile transformation by generating the semantic representations facilitates in providing privacy protection with reduced errors in clustering.

The cluster identifiers thus obtained may be used for clustering the user device into one or more clusters, i.e., interest groups corresponding to the cluster identifiers. Further, the cluster identifiers are provided to one or more remote nodes, for example, a central aggregator, an interest group aggregator, and another user device over a communication channel, for instance, an anonymous communication channel.

In one implementation, the remote node communicating with the user device may be selected depending on the application or type of recommendation based service for which the user device may be used. For instance, in case of a collaborative filtering application, the remote nodes may be central aggregators with each central aggregator corresponding to at least one cluster, i.e., an interest group, such as movies, dances, e-shopping, social networking sites, or a combination thereof. The user device may thus provide each of the cluster identifiers to the corresponding central aggregator along with the interest profiles of the user to enable the central aggregator to identify highest ranked, i.e., top ranked interest field after the interest field of the interest group in their corresponding interest groups. For example, a central aggregator responsible for the interest group on 'music' may receive interest profiles of all the user devices having the corresponding cluster identifier. The central aggregator may subsequently analyze the user profiles to identify other interest fields or interests ranked highly because of, for example, being present in interest profiles of a majority, say 90%, end users. For instance, the central aggregator may identify 'dance' as the highest ranked interest and may thus obtain recommendations corresponding to dance from the central aggregator responsible for the interest field 'dance'. The central aggregator may thus provide contents and recommendations related to music as well as dance to all the user devices present in the cluster corresponding to the cluster 'music'. The central aggregator may thus provide contents and recommendations related to not only the interest of the user but also a new interest or item that is highly ranked in the interest group. In another embodiment, the central aggregator may be replaced with each user device acting as a central aggregator responsible for an interest group.

Similarly, in case of content-based recommendation applications, the remote nodes may be interest group aggregators with each interest group aggregator corresponding to at least one cluster, i.e., an interest group, such as movies, dances, e-shopping, social networking sites. The user devices in such a case are configured to transmit the cluster identifier and the semantic representations to the interest group aggregator corresponding to the cluster identifier, based on which the interest group aggregator may provide content corresponding to the cluster identifier.

Further, in applications involving peer-to-peer communications, the remote nodes may be other user devices. In such applications, the user devices may use the cluster identifiers to identify other user devices having similar cluster identifiers so as to enable chatting and exchange of data between the user devices using anonymous communication channels. Using the anonymous communication channels helps in ensuring that the other users or the remote nodes are not able to identify the end user transmitting the cluster identifiers as the cluster identifiers and other data are sent using various intermediary nodes forming the anonymous communication channels.

The systems and methods of the present subject matter thus facilitate in providing privacy to the end users by assigning cluster identifiers to the interest profiles at the user devices. Assigning cluster identifiers to the interest profiles at the user devices using the LSH technique enables clustering of similar users at remote nodes without the remote nodes accessing the interest profiles of the end users, thus providing privacy protection to the end users. Further, using the LSH technique in conjunction with generating the semantic representations helps in ensuring that privacy is protected and errors in clustering are reduced as using the semantic metadata database helps in reducing the occurrences of false negatives and false positives, thus increasing the efficiency in clustering. Thus, providing cluster identifiers at the user devices facilitates content providers in performing data analytics and providing personalized services faster and efficiently as the services provides now do not need to analyze the interest profiles and may use any content matching techniques to match the cluster identifier with the content data. Additionally, using the cluster identifiers reduces costs and saves resources at the service provider's end as the service providers now do not need to process or analyze the interest profiles.

It should be noted that the description and figures merely illustrate the principles of the present subject matter. It will thus be appreciated that those skilled in the art will be able to devise various arrangements that, although not explicitly described or shown herein, embody the principles of the present subject matter and are included within its spirit and scope. Furthermore, all examples recited herein are principally intended expressly to be only for pedagogical purposes to aid the reader in understanding the principles of the present subject matter and the concepts contributed by the inventor(s) to furthering the art, and are to be construed as being without limitation to such specifically recited examples and conditions. Moreover, all statements herein reciting principles, aspects, and embodiments of the present subject matter, as well as specific examples thereof, are intended to encompass equivalents thereof.

It will also be appreciated by those skilled in the art that the words during, while, and when as used herein are not exact terms that mean an action takes place instantly upon an initiating action but that there may be some small but reasonable delay, such as a propagation delay, between the initial action and the reaction that is initiated by the initial action. Additionally, the word "connected" and "coupled" is used throughout for clarity of the description and can include either a direct connection or an indirect connection.

The manner in which the systems and methods of clustering user profiles for privacy protection to end users shall be implemented has been explained in details with respect to the FIGS. 1-4. While aspects of described systems and methods for clustering user profiles for providing privacy protection can be implemented in any number of different computing systems, transmission environments, and/or configurations, the embodiments are described in the context of the following exemplary system(s).

FIG. 1 illustrates a network environment 100 implementation of privacy protected clustering of user profiles for privacy protection of end users while facilitating data analytics and accessing personalized services, in accordance with an embodiment of the present subject matter. The network environment 100 includes one or more user devices 102-1, 102-2, . . . , and 102-N, collectively referred to as user devices 102 and individually referred to as user device 102 hereinafter, communicating with each other and a remote node 104 through a communication network 106.

The communication network 106 may be a wireless network, or a combination of wired and wireless network. The communication network 106 can be a collection of individual networks, interconnected with each other and functioning as a single large network (e.g., the internet or an intranet). Examples of such individual networks include, but are not limited to, 3rd Generation Partnership Project (3GPP), Long Term Evolution (LTE), Global System for Mobile Communication (GSM) network, Universal Mobile Telecommunications System (UMTS) network, Personal Communications Service (PCS) network, Time Division Multiple Access (TDMA) network, Code Division Multiple Access (CDMA) network, Next Generation Network (NGN), Public Switched Telephone Network (PSTN), and Integrated Services Digital Network (ISDN). The communication networks 106 may be any public or private network, including a local area network (LAN), a wide area network (WAN), the Internet, an intranet, a peer to peer network and a virtual private network (VPN) and may include a variety of network devices, such as routers, bridges, servers, computing devices, storage devices, etc.

The user devices 102 may be defined as User Equipments (UEs) used by end users to communicate with each other or with other network entities such as remote node 104 and distributed servers for facilitating data analytics and accessing various personalized services, such as recommendation services; personalized content, personalized search/query, social networks, data mining, and other related services. Examples of the user devices 102 may include, without limitation, computing devices, such as a laptop or other portable computers, a desktop computer, a notebook, network computers; a mobile phone; hand-held devices; a personal digital assistant; a workstation; a mainframe computer; a set top box a media player; central directory servers; database server; file server; print server; web server; application serve; and the like. Each of the user devices 102 works on a communication protocol as defined by the communication network 106 to which the user device 102 is coupled. Further, the user devices 102 are configured to interact with each other or other network entities, such as the remote node 104 over the communication network 106 using one or more of communication channels 108-1, 108-2, 108-3, 108-4, 108-5 . . . , 108-$n$, hereinafter collectively referred to as the communication channels 108. In one implementation the communication channels 108 may be anonymous communication channels configured based on, for example, onion routing framework, such as TOR to support anonymous communication between the user devices 102 and between the user devices 102 and other network entities, such as the remote node 104.

The remote node 104 can be implemented as a variety of computing devices, such as a laptop computer, a desktop computer, a notebook, a workstation, a mainframe computer, a server, and the like. Although the remote node 104 is shown as an entity, the remote node 104 may also be implemented as a distributed computing system including multiple intermediary nodes distributed over a network where each node can be implemented as a computing devices, such as a laptop computer, a desktop computer, a notebook, a workstation, a mainframe computer, a server, and the like. Further, the intermediary nodes may be connected through an intermediate network (nor shown in the figure) for the purpose of communications and exchange of data. Further, examples of the remote node 104 include, but are not limited to, a central aggregator, an interest group aggregator, and a user device 102.

In one implementation, the remote node 104 communicating with the user device 102 may be selected depending on the application or type of recommendation based service for which the user device 102 may be used. For instance, in case of a collaborative filtering application, the remote node 104 may be a central aggregator, similarly in the case of content-based recommendation applications, the remote node 104 may be implemented as interest group aggregators.

In one embodiment, interest profiles of the end users are generated based on the activities of the end users and saved locally by the user device 102. For example, the interest profiles of the end users may be generated based on profile data corresponding to the end users. The profile data may indicate, for example, websites visited by the end users, songs or videos played or downloaded by the end users, products used or services availed or reviewed by the end users, etc. Based on the generated interest profile, the client device categorizes the end user in one or more pre-defined interest groups. Interest groups may be understood as groups of end users sharing similar interests and choices.

For the purpose, the user device 102 may include a profile transformation module 110 and a cluster identifier module 112. The profile transformation module 110 is configured to transform the interest profile into compact and semantically dense representations, referred to as semantic representations. Semantic representations include, as an example and not a limitation, tag based representations, ontology concept based representations, and topic based representations. In one embodiment, the complete interest profile may be transformed to the semantic representations by the profile transformation module 110. In another embodiment segments of the interest profile, hereinafter referred to as interest profile segments, may be transformed into the semantic representations. Although the description herein is with reference to interest profile segments, the methods and systems may be implemented for transforming the complete interest profile, albeit with a few variations, as will be understood by a person skilled in the art.

In order to transform the interest profiles, the profile transformation module 110 may interact with a database, such as a semantic metadata database 114 over the communication channel 108-1 to obtain metadata related to each of the interest profile segments. The semantic metadata database 114 may be understood as a dictionary having a list of semantic terms that may be used for transforming the interest profile segments into corresponding semantic representations. The semantic terms may be understood as terms that identify various interest fields of the end user based on their broad meaning or definition and thus may be used for efficient and errorless matching of various interest profiles based on concept of each interest field. Examples of the interest fields include, but are not limited to, contextual preferences, such as professional interests, leisure preferences, and religious preferences and areas of interest, such as music, dance, e-shopping, and social networking. For instance, the interest profiles corresponding to two different URLs of a social networking site "xyz.com" may be matched to the semantic term "social networking site" in spite of the URLs being of different versions and thus being syntactically different. Although the semantic metadata database 114 has been shown external to the user device 102, it will be understood that the semantic metadata database 114 may be internal to the user device 102 in other embodiments. Further, in lateral cases the semantic metadata databases may be harmonized across the user devices by exchanging vocabulary and terms between the user devices.

The semantic representations thus generated by the profile transformation module 110 may be provided to the cluster identifier module 112 for assigning a cluster identifier to each of the semantic representations. The cluster identifiers may be understood as interest group identity codes that may be used for efficiently identifying the clusters, i.e., interest groups corresponding to the cluster identifiers to which the end user can be associated. The cluster identifier module 112 may be configured to use a technique of LSH for assigning the cluster identifiers. The LSH technique may be used by the cluster identifier module 112 to convert each of the semantic representations into corresponding hash codes, i.e., the cluster identifiers. For the purpose, the cluster identifier module 112 utilizes a set of hash functions defined by random values, such as a common sequence of random vectors generated at each of the user devices 102.

In one implementation, the hash functions are obtained by the cluster identifier module 112 from a central entity, such as a random seed generator (not shown in the figure) accessible by all the user device 102 to ensure cluster identification is done uniformly by all the user devices 102. In another implementation, the cluster identifier module 112 may be configured to generate the hash functions based on seed generation functions obtained from, for example, the central entity. Assigning cluster identifiers at the user device 102 thus facilitates in providing privacy protection as the interest profile are not shared with the remote nodes. Performing the clustering by the LSH technique in conjunction with profile transformation by generating the semantic representations thus facilitates in providing privacy protection with reduced errors in clustering.

The cluster identifiers thus obtained may be used for clustering user profiles of the user device 102, i.e., the end users into one or more clusters. Further, the cluster identifier module 112 provides the cluster identifiers to one or more remote nodes 104 over the communication channel 108 for one or more services, such as clustering for providing recommendation services or for peer-to-peer communication. Based on the application or type of recommendation based service which the user device 102 may want to utilize, the remote node 104 communicating with the user device 102 may vary from among a central aggregator and an interest group aggregator. Alternately, the user devices 102 may communicate with each other with each user device 102 acting as a remote node for other use devices 102.

For instance, in case of a collaborative filtering application, the remote nodes may be central aggregators with each central aggregator corresponding to at least one cluster, i.e., an interest group, such as movies, dances, e-shopping, social networking sites, and a combination thereof. The remote node 104 in such a case is configured to provide to each member of the cluster, recommendations related to not only the interest field corresponding to the group but also related to other top rated, i.e., highly ranked interest fields of the end users who are member of the cluster. In another embodiment, the remote node 104 acting as the central aggregator may be removed with each user device 102 acting as a central aggregator responsible for an interest group.

Similarly, in case of content-based recommendation applications, the remote node 104 may be implemented as one or more interest group aggregators with each interest group aggregator corresponding to at least one cluster, such as movies, dances, e-shopping, social networking sites. Further, in applications involving peer-to-peer communications, the remote node 104 may be another other user device. In such applications, the user devices 102 may use the cluster identifiers to identify other user devices 102 having similar cluster identifiers.

The systems and methods of the present subject matter thus facilitate in providing privacy to the end users by assigning cluster identifiers to the interest profiles at the user devices.

Figure 2:
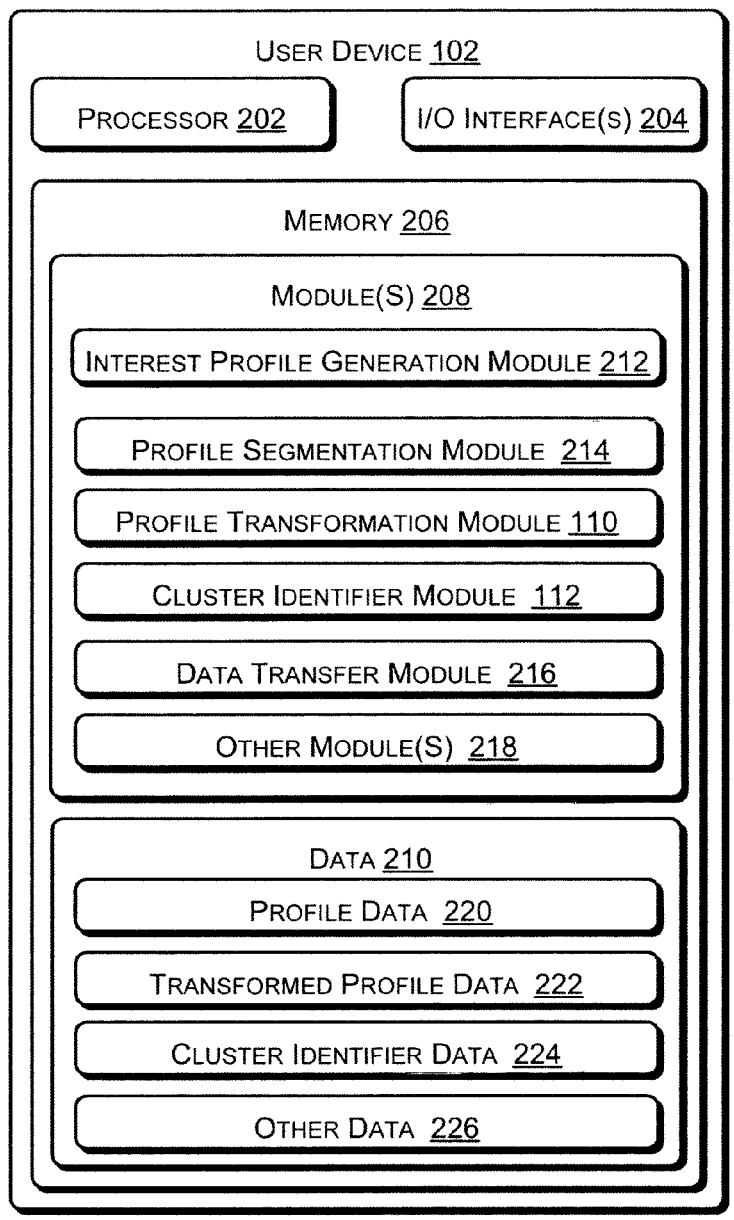
FIG. 2 illustrates components of a user device implementing the privacy protected clustering of user profiles for privacy protection off personal information, in accordance with an embodiment of the present subject matter.

FIG. 2 illustrates components of the user device 102 implementing the privacy protected clustering of user profiles, in accordance with an embodiment of the present subject matter. In said embodiment, the user device 102 includes one or more processor(s) 202, I/O interface(s) 204, and a memory 206 coupled to the processor(s) 202. The processor(s) 202 may be implemented as one or more microprocessors, microcomputers, microcontrollers, digital signal processors, central processing units, state machines, logic circuitries, and/or any devices that manipulate signals based on operational instructions. The processor(s) 202 can be a single processing unit or a number of units, all of which could also include multiple computing units. Among other capabilities, the processor(s) 202 are configured to fetch and execute computer-readable instructions stored in the memory 206.

Functions of the various elements shown in the figure, including any functional blocks labeled as "processor(s)", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included.

The I/O interface(s) 204 may include a variety of software and hardware interfaces, for example, interface for peripheral device(s), such as a keyboard, a mouse, an external memory, a printer, etc. Further, the I/O interface(s) 204 may enable the user device 102 to communicate over the communication network 106, and may include one or more ports for connecting the user device 102 with other computing devices, such as web servers and external databases. The I/O interface(s) 204 may facilitate multiple communications within a wide variety of protocols and networks, such as a network, including wired networks, e.g., LAN, cable, etc., and wireless networks, e.g., WLAN, cellular, satellite, etc.

The memory 206 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 further includes modules 208 and data 210. The modules 208 include routines, programs, objects, components, data structures, etc., which perform particular tasks or implement particular abstract data types. The data 210, amongst other things, serves as a repository for storing data processed, received, and generated by one or more of the modules 208.

The modules 208 further include an interest profile generation module 212, a profile segmentation module 214, the profile transformation module 110, the cluster identifier module 112, a data transfer module 216, and other modules 218. The other module(s) 218 may include programs or coded instructions that supplement applications and functions of the user device 102, for example, programs in the operating system.

The data 210 includes profile data 220, transformed profile data 222, cluster identifier data 224, and other data 226. The other data 226 may include data generated as a result of the execution of one or more modules in the other module(s) 218.

As previously described, the user device 102 is configured to provide privacy protection to the end user by computing the cluster identifiers for clustering the user profiles. In one embodiment, the interest profile generation module 212 is configured to generate the interest profile of the end user of the user device 102 based on the profile data 220. The profile data 220 may indicate, for example, websites visited by the end users, songs or videos played or downloaded by the end users, products used or services availed or reviewed by the end users, etc. For instance, the interest profile generation module 212 may obtain details of all videos searched for or watched by the end user, all URLs visited by the end user, music listened to and searched by the end user, and similar data related to other interest fields explored by the end users. The interest profiles thus generated may be stored in the profile data 220. The profile transformation module 110 may subsequently transform the interest profile into the semantic representations for assigning cluster identifiers. As discussed previously, the profile transformation module 110 may be configured to transform either the complete interest profile or the interest profile segments into the semantic representations. In latter cases, the interest profiles are accessed and segmented by the profile segmentation module 214 before being transformed by the profile transformation module 110.

In one embodiment, the profile transformation module 110 is configured to segment interest profile into multiple interest profile segments with each interest profile segments corresponding to a particular interest field. In one implementation, the profile transformation module 110 may analyze the interest profile of the end user to segment the interest profile. The profile transformation module 110 may segment the interest profiles into the interest profile segments based on either contextual preferences, such as leisure preferences and professional interests or explicit areas of interest, such as music, dance, e-shopping, and social networking. The interest profile segments thus obtained may be provided to the profile transformation module 110.

The profile transformation module 110 transforms the interest profile segments or the complete interest profiles into corresponding semantic representations based on metadata provided in the semantic metadata database 114 that may be internal or external to the user device 102. In one embodiment, the profile transformation module 110 may provide the interest profile segments to the semantic metadata database 114. The semantic metadata database 114 in such a case may identify the semantic terms corresponding to each of the interest profile segments and provide the same to the profile transformation module 110 for transforming the interest profile segments into the corresponding semantic representations. In another embodiment, the profile transformation module 110 may obtain the list of the semantic terms from the semantic metadata database 114. The profile transformation module 110 in such a case may be configured to identify the semantic term, from the list of the semantic terms, matching the interest profile segment to obtain the corresponding semantic representations.

In yet another embodiment, the profile transformation module 110 may generate the semantic representations by tagging the interest profile segments or the complete interest profiles using metadata, such as tags extracted from web pages visited by the end user on the user device 102. Such locally extracted tags may be stored as internal semantic metadata in the other data 226 of the user device 102. In said embodiment, the user devices are configured to share a vocabulary of semantic terms with each other so that the semantic representations generated by the different user devises are expressed using same terms and are therefore comparable. Using the semantic metadata database helps in reducing the occurrences of false negatives and false positives, thus increasing the efficiency of the clustering. The semantic representations thus obtained may be stored in the transformed profile data 222 and accessed by the cluster identifier module 112 for assigning the cluster identifiers to each of the semantic representations for further clustering.

The cluster identifier module 112, as described in FIG. 1, is configured to assign cluster identifiers to each of the semantic representations to enable clustering of the end user's profile. The cluster identifier module 112 uses the LSH technique for assigning the cluster identifiers to the semantic representations. As will be understood by a person skilled in the art, in LSH technique, two similar objects hash to the same value with a high probability as a hash collision probability of two profiles is proportional to similarity between the two profiles, as represented using the following equation:

$$Pr[h(x)=h(y)] \approx sim(x,y) \qquad (1)$$

where x and y are two profiles, h( ) is a LSH function, and sim( ) is a similarity measure between to profiles. Further, to achieve the functionality of the LSH technique, it is ensured that similar hash functions are used by the user device 102 for the LSH technique.

The cluster identifier module 112 is configured to use the value generated by the hash functions as the cluster identifier, i.e., the label or the group id of the interest group of the end users having similar interests, i.e., the end users having similar interest profiles. For the purpose, the cluster identifier module 112 initially obtains a set of random vectors, also referred to as hash functions, from a central entity, such as the random seed generator. The cluster identifier module 112 subsequently uses, for example, cosine similarity method of the LSH technique. In said method the cluster identifier module 112 obtains dot product between the semantic representations and each of the random vectors and concatenates sign of the dot products to obtain the hash code as the cluster identifier for the semantic representation. The cluster identifiers thus obtained may be stored in the cluster identifier data 224. Although the description herein is with reference to cosine similarity method of the LSH technique, the methods and systems may be implemented using other implementations of the LSH technique, as will be understood by a person skilled in the art. Performing the clustering by the LSH technique in conjunction with profile transformation by generating the semantic representations facilitates in providing privacy protection with reduced errors in clustering. Further, generating the semantic representations before performing the clustering using the LSH technique helps in ensuring that the remote node 104 is not able to perform a linear search over the cluster members.

The data transfer module 216 subsequently transmits the cluster identifiers to the remote node 104 over the communication channels 108, for example, for receiving the recommendation or contents from the service provider. In one implementation, the method of transferring the cluster identifiers to the remote node 104 may vary depending on the application for which the clustering is performed. For instance, in case of the collaborative filtering application, the data transfer module 216 may be configured to transmit not only the cluster identifiers but also the interest profile of the end user to the remote node 104 to enable the remote node to analyze the user profile for providing group recommendations. The data transfer module 216 in such a case may be configured to slice the interest profiles into smaller profile slices and transmit each of the smaller profile slices to the remote node 104 independently over different anonymous communication channel, such as the communication channels 108. The profile slices, unlike the profile segments, are transmitted without being converted to semantic representations so as to enable the remote node to analyze the profile slices. Transmitting the user profiles as different slices over anonymous communication channels ensures privacy protection as the remote node 104 may not be able to easily identify the end users based on the slices of the interest profile. In another embodiment of the collaborative filtering application, the remote node 104 may be replaced and each user device (102) may be configured to act as a central aggregator responsible for an interest group.

Further, in case of the content-based recommendation applications, the data transfer module 216 may be configured to transmit the cluster identifier and the semantic representations to the remote node 104 for utilizing the recommendation or analytics services offered by the service providers. Similarly in the case of peer-to-peer communications, the data transfer module 216 may be configured to identify other user devices 102 having similar cluster identifiers so as to enable chatting and exchange of data between the user devices 102. On identifying the other user devices 102, the data transfer module 216 may be configured to transmit establish anonymous messaging channels and anonymous chat or search broadcast channels between the other user devices. The working of the data transfer module 216 in each of the applications will be explained in greater details while describing the applications in the FIGS. 3(a), 3(b), and 3(c).

Figure 3A:
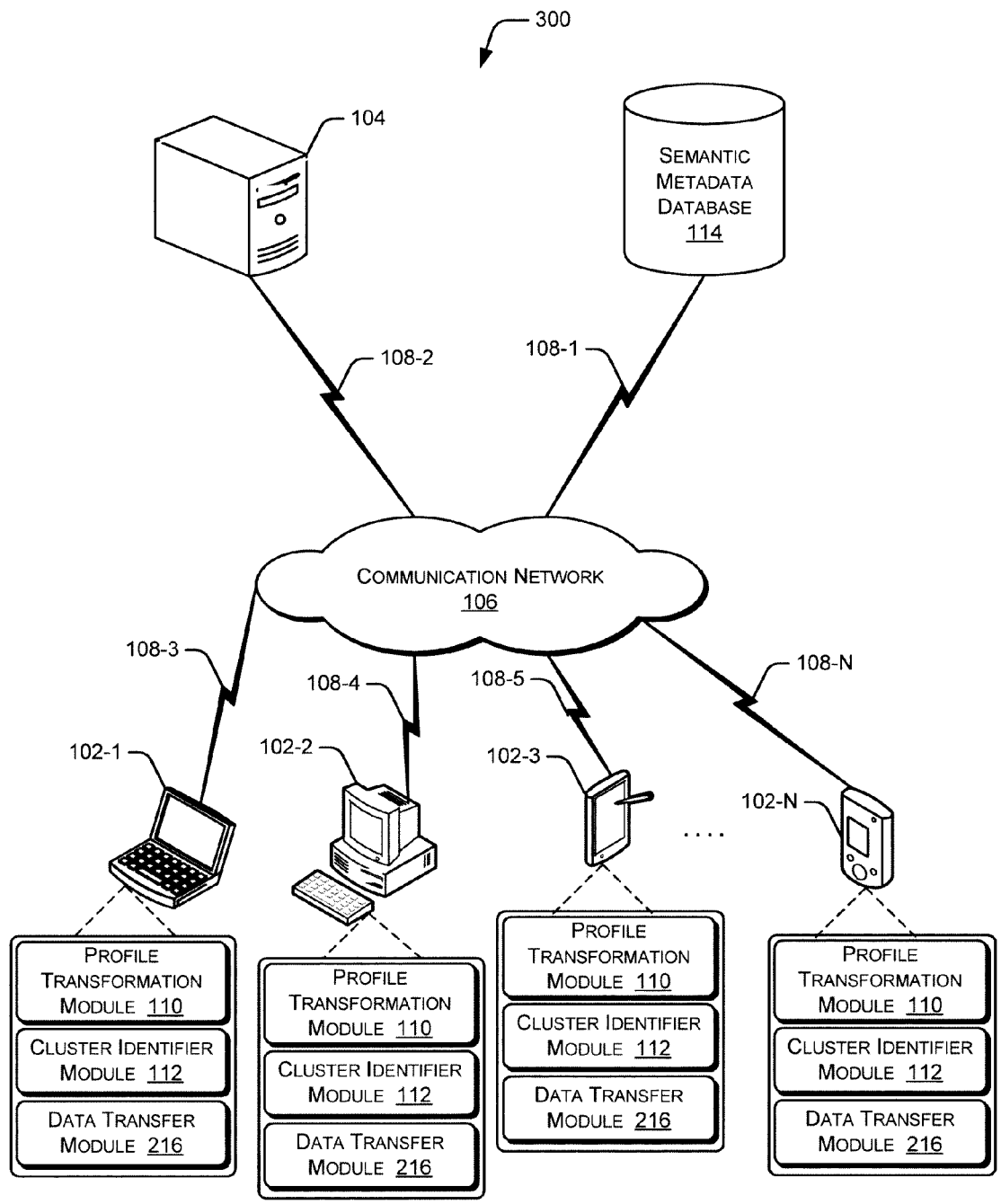
FIGS. 3(a), 3(b), and 3(c) illustrate exemplary network environment implementations of various applications implementing privacy protected clustering of user profiles, according to an embodiment of the present subject matter.
Figure 3B:
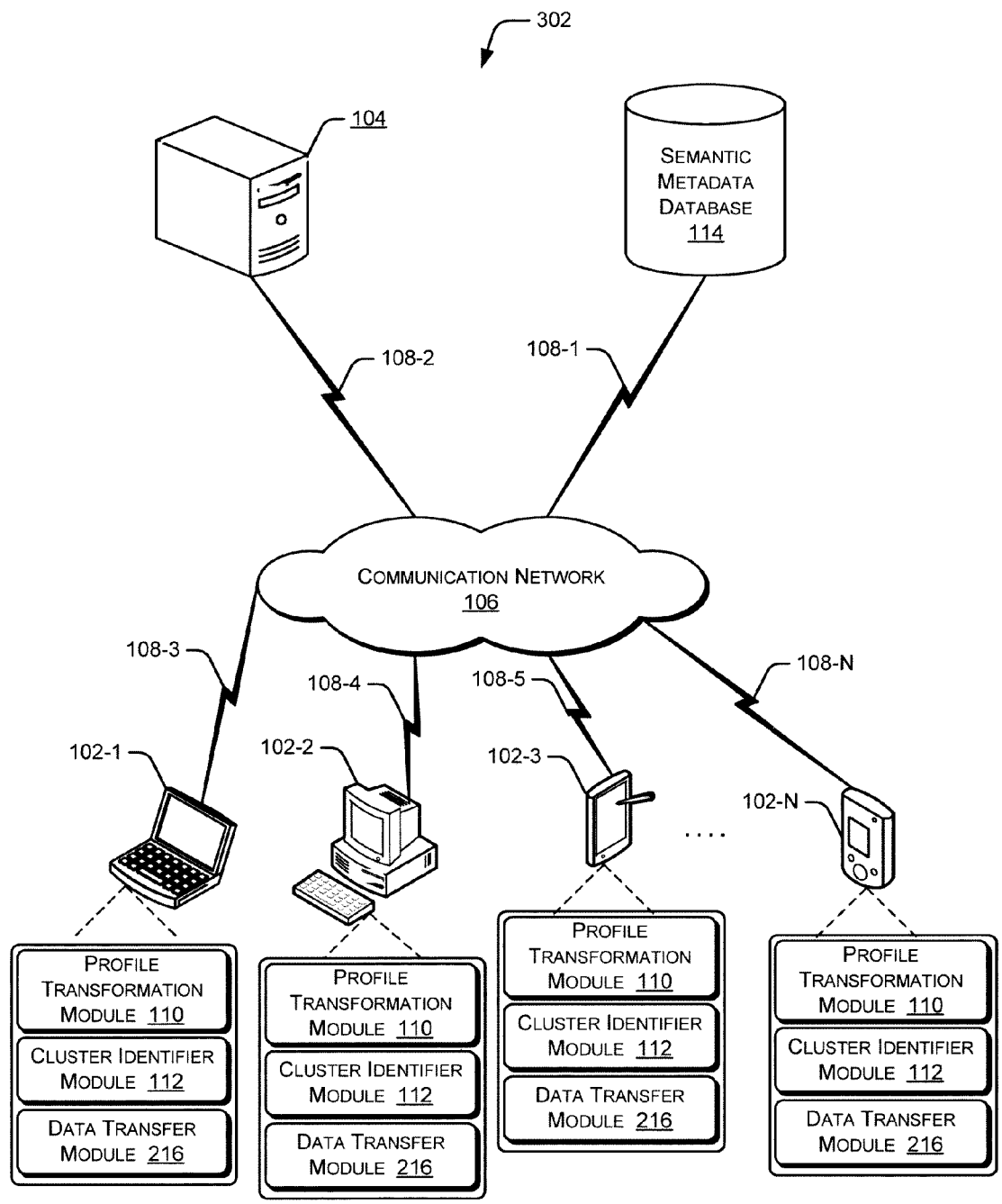
Figure 3C:
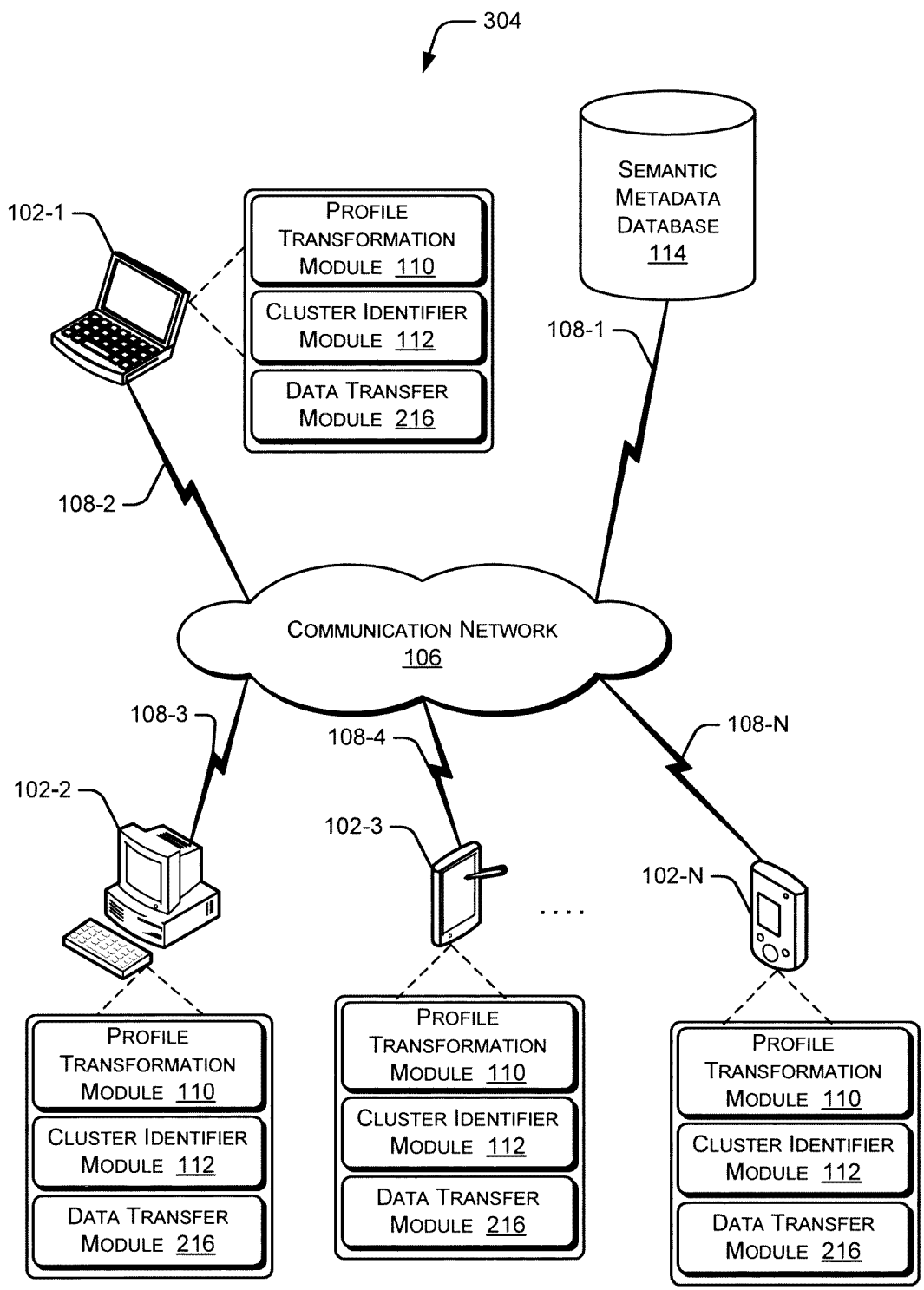

FIGS. 3(a), 3(b), and 3(c) illustrate exemplary network environment implementations 300, 302, and 304, respectively, of privacy protected clustering of user profiles for various applications, according to an embodiment of the present subject matter.

FIG. 3(a) illustrates the network environment 300 implementing the privacy protected clustering of user profiles for collaborative filtering application providing group recommendations to members of a cluster. In said embodiment of a collaborative filtering application, the remote node 104 is implemented as the central aggregator corresponding to at least one cluster, such as movies, dances, e-shopping, social networking sites. The user device 102 may thus provide each of the cluster identifiers to the corresponding central aggregator along with the interest profiles of the end user to enable the central aggregator to identify highest ranked, i.e., top ranked interest field after the interest field of the interest group in their corresponding interest groups.

In one embodiment, the data transfer module 216 is configured to slice the interest profile into smaller independent slices that may be communicated through various communication channels 108 in order to ensure unlinkability between the various profile segments received by the remote node 104. Providing the unlinkability ensures that the remote node 104 may not be able to identify whether the different profile segments belong to the same user or a different user. The data transfer module 216 ensures that no slice of the interest profile of the end user by itself contains enough profile information that can be used to construct the complete interest prolife and infer the identity of the end user. In another embodiment, the whole interest profile may be sent as a single slice to the remote node 104.

Further, each of the interest profile slices and the cluster identifier are sent by the data transfer module 216 through anonymous communication channels over a network employing mechanisms which ensures anonymity, for example, a network implementing onion routing. In one implementation, an onion-routing path is established wherein the data transfer module 216 encrypts the slices of the profile information and the cluster identifier pertaining to the end user with the public-key of an exit node of the onion-routing path. The various slices of the profile information and the cluster identifiers pertaining to the end user are transmitted over one or more intermediate nodes before reaching the exit node. The exit-node decrypts the information and transmits the same to the remote node 104.

Further, in order to ensure user privacy, the data transfer module 216 may be configured to remove, from the interest profile, all data having personally identifiable information, such as URLs that may reveal the identity of the end users to the remote node 104.

On receiving the interest profile and the cluster identifiers of the end user, the remote node 104 analyzes the interest profile to determine the highest or one or more highly ranked interest of the end users clustered in the cluster corresponding to the remote node 104. For example, the remote node 104 responsible for the interest group 'social networking' may receive interest profiles of all the user devices having the cluster identifier corresponding to the cluster 'social networking'. The remote node 104 may subsequently analyze the user profiles of the user device 102 to identify other interests ranked highly. On identifying, for instance, 'news' as the highest ranked interest the remote node 104 may obtain recommendations corresponding to 'news' from the central aggregator responsible for the interest field 'news'. The remote node 104 may thus provide contents and recommendations related to social networking as well as news to all the user devices 102 present in the cluster corresponding to the cluster 'social networking'.

In another embodiment of the collaborative filtering application, the remote node 104 acting as the central aggregator may be removed with each user device 102 acting as a central aggregator responsible for an interest group. For the purpose, the data transfer module 216 is configured to maintain at least a partial image of the central aggregator node of the interest groups of the end user. In said embodiment, the end users having similar interest profiles may be identified based on the conventional gossip based random peering protocol, as will be known to persons skilled in the art. The data transfer module 216 may thus be configured to transmit and receive the cluster identifiers of all the user devices 102 to identify the end users having similar cluster identifier, i.e., similar interest groups.

FIG. 3(*b*) illustrates the network environment 302 implementing the privacy protected clustering of user profiles for content-based recommendation applications. In said embodiment the remote node 104 is implemented as one or more interest group aggregators with each interest group aggregator corresponding to at least one cluster, such as movies, dances, e-shopping, social networking sites.

The data transfer module 216, in such a case, is configured to transmit the cluster identifier and the semantic representations to the remote node 104 over an anonymous communication channel, such as the communication channel 108. For the purpose, the data transfer module 216 establishes an onion-routing path with the data transfer module 216 encrypting the cluster identifier pertaining to the end user with the public-key of an exit node of the onion-routing path as described in FIG. 3(*a*). The remote node 104 in such a case is configured to select recommendations or contents related to the interest field represented by the cluster identifier by matching the cluster identifier with a list of interest fields using any of the well known content matching techniques. For example, if the end user, say user A, belongs to a cluster having interest field 'books', the service provider may provide a list of latest top sellers to the user A.

FIG. 3(*c*) illustrates the network environment 304 implementing the privacy protected clustering of user profiles for applications related to peer-to-peer communications. In said embodiment the remote node 104 is removed as the user devices 102 use the clustering for interacting with each other in a privacy protected environment. In such applications, the user devices 102 may use the cluster identifiers to identify other user devices 102 having similar cluster identifiers. The data transfer module 216, in such a case, is configured to transmit the cluster identifier over an anonymous communication channel, such as the communication channel 108 to the other user devices 102. The data transfer module 216 use a gossip based random peering protocol to transmit the cluster identifier and identify user device 102 having similar cluster identifiers. The user devices 102 having common cluster identifiers may subsequently connect to each other anonymously using, for example, onion routing framework, such as TOR so as to enable chatting and exchange of data between the user devices without revealing their identity or personnel information.

Figure 4:
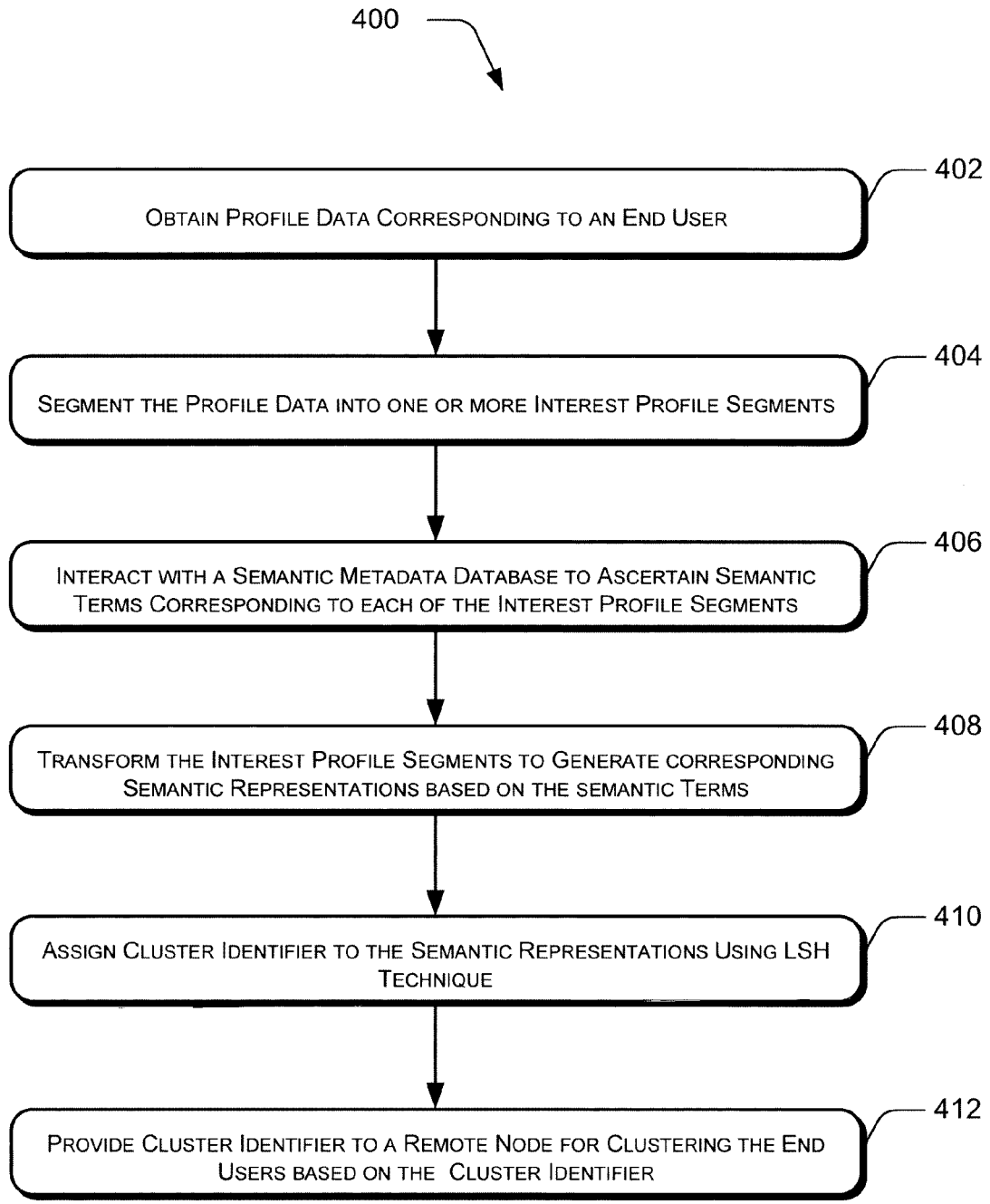
FIG. 4 illustrates a method of privacy protected clustering of user profiles to provide privacy protection to end users, in accordance with an embodiment of the present subject matter.

FIG. 4 illustrates a method of privacy protected clustering of user profiles to provide privacy protection to end users, in accordance with an embodiment of the present subject matter. The order in which the method is described is not intended to be construed as a limitation, and any number of the described method blocks can be combined in any order to implement the method 400 or any alternative methods. Additionally, individual blocks may be deleted from the methods without departing from the spirit and scope of the subject matter described herein. Furthermore, the methods can be implemented in any suitable hardware, software, firmware, or combination thereof.

The method(s) may be described in the general context of computer executable instructions. Generally, computer executable instructions can include routines, programs, objects, components, data structures, procedures, modules, functions, etc., that perform particular functions or implement particular abstract data types. The method may also be practiced in a distributed computing environment where functions are performed by remote processing devices that are linked through a communications network. In a distributed computing environment, computer executable instructions may be located in both local and remote computer storage media, including memory storage devices.

A person skilled in the art will readily recognize that steps of the methods can be performed by programmed computers. Herein, some embodiments are also intended to cover program storage devices, for example, digital data storage media, which are machine or computer readable and encode machine-executable or computer-executable programs of instructions, where said instructions perform some or all of the steps of the described method. The program storage devices may be, for example, digital memories, magnetic storage media, such as a magnetic disks and magnetic tapes, hard drives, or optically readable digital data storage media. The embodiments are also intended to cover both communication network and communication devices configured to perform said steps of the exemplary methods.

At block 402, profile data corresponding to an end user is obtained by a user device, for example, the user device 102. In one implementation, the profile data may be obtained based on websites visited by the end users, songs or videos played or downloaded by the end users, products used or services availed or reviewed by the end users, etc. An interest profile generation module, for example, the interest profile generation module 212 may be configured to obtain details of all videos searched for or watched by the end user, all URLs visited by the end user, all queries made by the end user, and similar data related to other interest fields explored by the end users. The interest profiles thus generated may be stored as the profile data.

At block 404, the profile data is segmented into one or more interest profile segments. In one implementation, a profile segmentation module, such as the profile segmentation module 214 is configured to segment the interest profile into multiple segments, refereed to as the interest profile segments. The interest profile segments may be understood as independent segments of the interest profiles with each segment corresponding to a particular interest field. Examples of the interest fields include, but are not limited to, contextual preferences, such as professional interests, leisure preferences, and religious preferences and areas of interest, such as music, dance, e-shopping, and social networking. Each of the interest profile segments are subsequently processed independently to obtain the cluster identifiers for clustering. Further, in another embodiment, the interest profile as a whole may be provided as a single interest profile segment for the clustering.

At block 406, semantic terms corresponding to each of the interest profile segments are ascertained based on interaction with a semantic metadata database. In one implementation, a profile transformation module, such as the profile transformation module 110 may be configured to provide the interest profile segments to the semantic metadata database over an anonymous communication channel. On receiving interest profile segments, the semantic metadata database identifies, from a list of semantic terms, the semantic terms corresponding to each of the interest profile segments. Alternately, the profile transformation module 110 may interact with an internal semantic metadata of the user device 102 populated using data, such as tags extracted from web pages visited by the end user on the user device 102. In said embodiment, the user devices 102 are configured to share a vocabulary of semantic terms with each other so as to maintain uniformity across semantic terms generated used by all the user devices 102.

At block 408, interest profile segments are transformed to generate corresponding semantic representations based on the semantic terms. For example, a profile transformation module, such as the profile transformation module 110 is configured to transform the interest profile segments, for example, by tagging each of the interest profile segments with corresponding semantic representations obtained from the semantic metadata database. The interest profile segments may be alternately transformed into ontology concept based or topic based semantic representations. The semantic representations thus obtained may be saved in the transformed profile data 222.

At block 410, cluster identifiers are assigned to the semantic representations using LSH technique. In one implementation, hash functions defined by a set of random values, such as a common sequence of random vectors are used for assigning the cluster identifiers. For example, a cluster identification module, such as the cluster identifier module 112 may obtain the hash functions from a central entity, such as a random seed generator accessible by the user devices to ensure uniform cluster identification. Performing the clustering by the LSH technique in conjunction with profile transformation using a common set of semantic representations thus facilitates in providing privacy protection with reduced errors in clustering.

At block 412, cluster identifiers corresponding to each of the interest profile segments are provided to a remote node for clustering the user interest profiles based on the cluster identifiers. In one implementation, the remote node may be a central entity and may vary from a central aggregator node to an interest aggregator node depending on the type of application for which the clustering is being performed. For instance, the remote node may be implemented as an interest group aggregator in case of content-based recommendation applications. The user devices in such a case are configured to transmit, over an anonymous communication channel, each of the cluster identifiers and the semantic representations to the interest group aggregator corresponding to the cluster identifiers.

Similarly, in case of a collaborative filtering application, the remote nodes may be implemented as central aggregators configured to provide to each member of the cluster, recommendations related to not only the interest field corresponding to the group but also related to other highly ranked interest fields of the end users of the cluster. The user devices in such a case are configured to transmit, over an anonymous communication channel, each of the cluster identifiers along with slices of the interest profiles of the end user to enable the user devices to the interest group aggregator corresponding to the cluster identifiers. In another embodiment, the user devices may interact with other user devices such that each of the user devices acts either as a remote node for the other user devices or a central aggregator responsible for an interest group.

Although embodiments for methods and systems for privacy protected clustering of user interest profiles in a communication network have been described in a language specific to structural features and/or methods, it is to be understood that the invention is not necessarily limited to the specific features or methods described. Rather, the specific features and methods are disclosed as exemplary embodiments for providing privacy protected clustering of user interest profiles.

We claim:

1. A method for privacy protected clustering of interest profiles of end users, the method comprising:
generating, by a user device, at least one interest profile segment based on an interest profile of an end user;
obtaining, by the user device, semantic terms corresponding to the at least one interest profile segment based on interaction with a semantic metadata database communicatively coupled to a user device of the end user, wherein the semantic terms are obtained from amongst one or more semantic terms provided in the semantic metadata database;
transforming, by the user device, each of the at least one interest profile segment into at least one semantic representation based on the semantic terms; and
assigning, by the user device, a cluster identifier to each of the at least one interest profile segment based on the at least one semantic representation, wherein the cluster identifier is generated using locality sensitive hashing technique.

2. The method as claimed in claim 1, wherein the method further comprises providing the at least one interest profile segment and the cluster identifier corresponding to each of the at least one interest profile segment to a remote node, wherein the remote node is configured to act as an interest group aggregator for an interest group associated with the cluster identifier, and wherein the cluster identifier is provided over an anonymous communication channel.

3. The method as claimed in claim 1, wherein the method further comprises:
establishing, by the user device, a plurality of anonymous communication channels with a remote node;
slicing the interest profile into one or more profile slices; and
transmitting, by the user device, the cluster identifier and each of the one or more profile slices to the remote node over the plurality of anonymous communication channels, wherein each of the one or more profile slices are transmitted separately over at least one of the plurality of anonymous communication channels.

4. The method as claimed in claim 3, wherein the method further comprises removing from the interest profile, personally identifiable information of the end user.

5. The method as claimed in claim 1, wherein the method further comprises:
transmitting, by the user device, the cluster identifier over a plurality of anonymous communication channels;
receiving, by the user device, cluster identifiers of other user devices over the plurality of anonymous communication channels;
identifying, based on the transmitting and the receiving, the other user devices having a cluster identifier similar to the cluster identifier of the end user; and
enabling exchange of data between the user device of the end user and the other user devices over at least one of the plurality of anonymous communication channels.

6. The method as claimed in claim 1, wherein the assigning further comprises:
  obtaining a dot product between each of the at least one interest profile segment and a set of hash functions; and
  concatenating signs of the dot products to obtain a hash code as the cluster identifier corresponding to the at least one interest profile segment.

7. The method as claimed in claim 1, wherein the transforming further comprises tagging each of the at least one interest profile segment based on the semantic terms to obtain the at least one semantic representation.

8. A user device comprising:
  a processor; and
  a memory coupled to the processor, the memory comprising instructions which when executed by the processor cause the processor to act as:
    a profile transformation module configured to:
      obtain semantic terms corresponding to at least one interest profile segment based on interaction with a semantic metadata database coupled to the user device, wherein the semantic terms are obtained from amongst one or more semantic terms provided in the semantic metadata database; and
      transform each of the at least one interest profile segment into at least one semantic representation; and
    a cluster identifier module configured to assign a cluster identifier to each of the at least one interest profile segment based on the at least one semantic representation, wherein the cluster identifier is generated using locality sensitive hashing technique.

9. The user device as claimed in claim 8, wherein the memory further comprises instructions which when executed by the processor cause the processor to act as:
  an interest profile generation module configured to generate an interest profile of an end user associated with the user device based on profile data of the end user; and
  a profile segmentation module configured to segment the interest profile into the at least one interest profile segment.

10. The user device as claimed in claim 8, wherein the memory further comprises instructions which when executed by the processor cause the processor to:
  establish an anonymous communication channel with an associated remote node configured to act as an interest group aggregator for an interest group associated with the cluster identifier; and
  provide the at least one interest profile segment and the cluster identifier corresponding to each of the at least one interest profile segments to the remote node, wherein the cluster identifier is provided over the anonymous communication channel.

11. The user device as claimed in claim 8, wherein the memory further comprises instructions which when executed by the processor cause the processor to:
  establish a plurality of anonymous communication channels with a remote node;
  remove personally identifiable information of the end user from the interest profile; and
  transmit the cluster identifier and the interest profile of the end user to the remote node over the plurality of anonymous communication channels.

12. The user device as claimed in claim 8, wherein the memory further comprises instructions which when executed by the processor cause the processor to:
  slice the interest profile into one or more profile slices; and
  transmit the cluster identifier and each of the one or more profile slices to a remote node over a plurality of anonymous communication channels, wherein each of the one or more profile slices are transmitted over separate anonymous communication channels.

13. The user device as claimed in claim 8, wherein the memory further comprises instructions which when executed by the processor cause the processor to:
  transmit the cluster identifier over a plurality of anonymous communication channels;
  receive cluster identifiers of other user devices over the plurality of anonymous communication channels;
  identify the other user devices having a cluster identifier similar to the cluster identifier of the end user based on the transmitting and the receiving; and
  enable exchange of data with the other user devices over at least one of the anonymous communication channels.

14. The user device as claimed in claim 8, wherein the memory further comprises instructions which when executed by the processor cause the processor to:
  obtain at least a partial image of a central aggregator node of interest groups of an end user of the user device;
  exchange the cluster identifier with other user devices over a plurality of anonymous communication channels;
  identify the other user devices having a cluster identifier similar to the cluster identifier of the end user based on cluster identifiers of the other user devices received over the plurality of anonymous communication channels; and
  provide recommendation services over at least one of the plurality of the anonymous communication channels to the other user devices identified based on the cluster identifiers.

15. A non-transient computer-readable medium having embodied thereon a computer program for executing a method of privacy protected clustering of interest profiles of end users, the method comprising:
  generating at least one interest profile segment based on an interest profile of an end user;
  obtaining semantic terms corresponding to the at least one interest profile segment based on interaction with a semantic metadata database coupled to a user device of the end user, wherein the semantic terms are obtained from amongst one or more semantic terms provided in the semantic metadata database;
  transforming each of the at least one interest profile segment into at least one semantic representation; and
  assigning a cluster identifier to each of the at least one interest profile segment based on the at least one semantic representation, wherein the cluster identifiers are generated using locality sensitive hashing technique.

* * * * *